(12) United States Patent
Furusako et al.

(10) Patent No.: US 10,730,134 B2
(45) Date of Patent: Aug. 4, 2020

(54) SPOT WELDING METHOD

(71) Applicant: NIPPON STEEL & SUMITOMO METAL CORPORATION, Tokyo (JP)

(72) Inventors: Seiji Furusako, Tokyo (JP); Yasunobu Miyazaki, Tokyo (JP); Hitomi Nishibata, Tokyo (JP); Yasuo Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 692 days.

(21) Appl. No.: 15/309,131

(22) PCT Filed: May 1, 2015

(86) PCT No.: PCT/JP2015/063111
§ 371 (c)(1),
(2) Date: Nov. 4, 2016

(87) PCT Pub. No.: WO2015/170687
PCT Pub. Date: Nov. 12, 2015

(65) Prior Publication Data
US 2017/0080515 A1 Mar. 23, 2017

(30) Foreign Application Priority Data

May 7, 2014 (JP) .................... 2014-096097
Oct. 16, 2014 (JP) .................... 2014-211771

(51) Int. Cl.
*B23K 11/24* (2006.01)
*B23K 11/16* (2006.01)
(Continued)

(52) U.S. Cl.
CPC ............ *B23K 11/24* (2013.01); *B23K 11/11* (2013.01); *B23K 11/115* (2013.01); *B23K 11/16* (2013.01);
(Continued)

(58) Field of Classification Search
CPC ....... B23K 11/24; B23K 11/115; B23K 11/11; B23K 11/16; B23K 2103/04;
(Continued)

(56) References Cited

U.S. PATENT DOCUMENTS

2013/0020288 A1* 1/2013 Moision ............... B23K 11/115
219/108
2014/0305912 A1* 10/2014 Taniguchi ............ B23K 11/24
219/91.22
(Continued)

FOREIGN PATENT DOCUMENTS

JP 2003-236674 A 8/2003
JP 2005-262259 A 9/2005
(Continued)

OTHER PUBLICATIONS

International Search Report for PCT/JP2015/063111 dated Aug. 11, 2015.
(Continued)

Primary Examiner — Dana Ross
Assistant Examiner — Joe E Mills, Jr.
(74) Attorney, Agent, or Firm — Birch, Stewart, Kolasch & Birch, LLP

(57) ABSTRACT

The spot welding method of the present invention has steps of preliminary conduction, first conduction, second conduction, and third conduction:
Preliminary conduction: Conduction method aimed at improving closeness of contact surfaces of steel sheets and reducing sheet gaps by gradually increasing the welding current (for example, upslope conduction). If rapidly applying current, current would be locally carried and that part would melt resulting in expulsion, so this is a conduction method gradually running current (for example upslope conduction) to avoid local heating.
(Continued)

First conduction: Conduction method running a constant welding current and using the heat generated by the electrical contact resistance between steel sheets to cause the formation of a nugget when preliminary conduction results in close contact surfaces between the steel sheets.

Second conduction: Conduction method making the current lower than the first conduction to suppress inside expulsion while making the nugget grow in the diametrical direction.

Third conduction: Conduction method making the current higher than the second conduction and making the nugget grow not only in the diametrical direction, but also mainly in the sheet thickness direction when the nugget size becomes a certain extent of size at the second conduction step.

19 Claims, 5 Drawing Sheets

(51) Int. Cl.
*B23K 11/11* (2006.01)
*B23K 101/00* (2006.01)
*B23K 101/18* (2006.01)
*B23K 103/04* (2006.01)

(52) U.S. Cl.
CPC .... *B23K 2101/006* (2018.08); *B23K 2101/18* (2018.08); *B23K 2103/04* (2018.08)

(58) Field of Classification Search
CPC .......... B23K 2101/18; B23K 2101/006; B23K 11/34; B23K 11/241
USPC .............................................. 219/108, 91.22
See application file for complete search history.

(56) References Cited

U.S. PATENT DOCUMENTS

2014/0308070 A1* 10/2014 Taniguchi ............... B23K 11/11
 403/271
2014/0367368 A1* 12/2014 Yang .................. B23K 11/0033
 219/91.22

FOREIGN PATENT DOCUMENTS

| JP | 2010-207909 A | 9/2010 |
|---|---|---|
| JP | 2010-240740 A | 10/2010 |
| JP | 2010-247215 A | 11/2010 |
| JP | 2012-91203 A | 5/2012 |
| JP | 2013-188752 A | 9/2013 |
| WO | WO 2007/077393 A2 | 7/2007 |

OTHER PUBLICATIONS

Written Opinion of the International Searching Authority for PCT/JP2015/063111 (PCT/ISA/237) dated Aug. 11, 2015.
Chinese Office Action, dated Apr. 21, 2020, for corresponding Application No. 201810749625.6, along with an English translation.

* cited by examiner

SPOT WELDING METHOD

TECHNICAL FIELD

The present invention relates to a spot welding method for joining a plurality of superposed steel sheets.

BACKGROUND ART

In the past, the main welding method in the automobile field has been spot welding. Steel sheets have been joined by spot welding to assemble the chassis and produce parts.

For example, in an automobile chassis, mild steel sheet excellent in shapeability and paintability has been used for outside panel parts with high design property. High strength steel sheet has been used for frame parts for ensuring inside strength and rigidity. Usually, mild steel sheet with a relatively thin sheet thickness and high strength steel sheet with a relatively thick sheet thickness are applied.

Therefore, portions arise where thin mild steel sheet and thick high strength steel sheet are joined by spot welding. At this time, sometimes the nugget (weld metal) is not sufficiently formed at the interface between the thin sheet and thick sheet.

PLT 1 proposes joining a plurality of steel sheets by resistance spot welding during which performing the resistance spot welding in two stages and performing the second stage of welding by a higher pressing force, lower current or same current, and longer conduction time or same conduction compared with the first stage of welding.

However, with the method of PLT 1, the pressing force at the time of the first stage of welding is low, so there is a sheet gap between the steel sheets (gap between steel sheets). Further, if the sheet thickness ratio (=total sheet thickness (mm)/thinnest sheet thickness (mm)) is large, sometimes a nugget is not sufficiently formed at the interface of a thin sheet and thick sheet and the desired joint strength cannot be obtained.

PLT 2 proposes a resistance welding method of high strength steel sheet for resistance welding a plurality of superposed steel sheets including at least one high strength steel sheet. Specifically, it proposes a resistance welding method of high strength steel sheet comprising a first step of running current to form a nugget having a nugget size of $3\sqrt{t}$ to $5\sqrt{t}$ (t: smallest sheet thickness of steel sheets (mm)), a second step of then lowering the welding current, and a third step of then running a welding current larger than the welding current of the first step to enlarge the nugget.

In the method of PLT 2, the pressing force is increased in the second step, but if there is a sheet gap and the sheet thickness ratio is high, it is difficult to secure the desired nugget size.

PLT 3 proposes a resistance welding method of steel sheet for resistance welding a plurality of superposed steel sheets including at least one high strength steel sheet. Specifically, it proposes a resistance welding method of high strength steel sheet comprising a first step of running current to form a nugget having a predetermined nugget size, a second step of then lowering the welding current, and a third step of then further running a welding current larger than the welding current of the first step and imparting a pressing force larger than the pressing force of the first step to enlarge the nugget.

In the method of PLT 3, to enlarge the nugget, at the third step, a pressing force larger than the pressing force of the first step is imparted, but in the same way as the method of PLT 2, if there is a sheet gap and the sheet thickness ratio is high, it is difficult to secure the desired nugget size.

PLT 4 proposes a method of spot welding three or more steel sheets having a gap G (2 (mm)) between steel sheets by multistage conduction comprising performing first conduction by upslope conduction then performing second conduction by the required conduction time and current value.

In the method of PLT 4, the current of the second stage is made smaller than the maximum current of the first stage, so the interface between a thin sheet and thick sheet is insufficiently melted, a predetermined shape of nugget is not obtained, and the desired joint strength sometimes cannot be obtained.

In this way, when superposing a plurality of steel sheets with a sheet gap and a high sheet thickness ratio, it is difficult to sufficiently melt the contact interface of a thin steel sheet and a thick steel sheet and sufficiently form the nugget and sometimes the desired joint strength cannot be obtained.

CITATION LIST

Patent Literature

PLT 1. Japanese Patent Publication No. 2005-262259A
PLT 2. Japanese Patent Publication No. 2010-207909A
PLT 3. Japanese Patent Publication No. 2010-247215A
PLT 4. Japanese Patent Publication No. 2013-188752A

SUMMARY OF INVENTION

Technical Problem

In automobile members, in many cases steel sheets not only different in sheet thickness, but also different in strength such as mild steel excellent in paintability and shapeability and high strength steel are superposed and spot welded (resistance welded). (The plurality of superposed steel sheets is called a "set of sheets".) That is, thin sheets and thick sheets and mild steel and high strength steel are complicatedly assembled and welded. In automobile members, steel sheets pressed into various shapes are used. However, elastic deformation called "springback" occurs after the press-forming. In particular, in high strength steel, the springback is large and the sheet gap becomes large when superposing steel sheets. When superposing and assembling steel sheets, sometimes a sheet gap of as much as 2 mm or so is formed. In spot welding, if the sheet gap is large and the pressing force is not sufficient, the contact area of the steel sheets before conduction becomes smaller. In this case, the conduction path becomes narrow, that is, the current density becomes high, so there is the problem that melting rapidly proceeds locally and expulsion occurs.

On the other hand, if spot welding a plurality of superposed steel sheets, usually a nugget is formed at the approximate center in the sheet thickness direction. The main reason is that the more heat is removed by the spot welding electrode and the closer to the electrode, the more the temperature falls. Therefore, if placing a steel sheet with a thin sheet thickness at the electrode side, it becomes difficult to form a nugget at the interface between the thin sheet and adjoining steel sheet.

In the case of an automobile member, there are portions where the thin mild steel sheet is arranged at the surface. The spot weldability with the high strength steel arranged adjoining it is becoming a problem. That is, the problem is the greatest when the sheet thickness ratio (sum of sheet thicknesses of superposed steel sheets/sheet thickness of thinnest steel sheet) is large and the steel sheet with the thinnest sheet thickness is arranged at the electrode side in the spot welding. PLTs 2 and 3 propose a conduction pattern of three steps when spot welding high strength steel. That is, preliminary conduction (first step) is used to secure the contact area of the steel sheets and eliminate expulsion at the initial stage of conduction. Conduction lowering the welding current (second step) and further conduction raising the welding current from the first step (third step) suppress inside expulsion occurring from the intermediate period to late period of the conduction. However, the sheet thickness is not recognized as a problem. The problem in the case of a large sheet thickness ratio cannot be solved.

PLT 4 proposes a spot welding method when there is a sheet gap and arranging a steel sheet with a thin sheet thickness at the electrode side, but the welding current at the second conduction is lowered, so it is not possible to secure a suitable nugget size. Also, the welding time becomes longer, so this is not practical.

The present invention has as its problem to solve these problems.

That is, it has as its problem to obtain a suitable welded joint in spot welding a plurality of superposed steel sheets even when the gap between steel sheets (sheet gap) is as much as 2 mm or so and further the sheet thickness ratio (sum of sheet thicknesses of superposed steel sheets/sheet thickness of thinnest steel sheet) is large. In particular, the invention has as its object application to an automobile member and as its object provision of spot welding enabling application even when arranging a relatively thin steel sheet at the outermost layer (electrode-most side).

Solution to Problem

The inventors studied in depth the solution to the problem. As a result, they obtained the following discoveries.

(a) They considered the mechanism of formation of a nugget in spot welding and discovered a conduction pattern enabling the suitable formation of a nugget without expulsion.

Preliminary conduction: Conduction method promoting contact between steel sheets and reducing sheet gap by gradually increasing the welding current (for example, upslope conduction). If rapidly applying current, current would be locally carried and that part would rapidly melt resulting in expulsion, so this is a conduction method gradually running current (for example upslope conduction) to avoid local heating.

First conduction: Conduction method running a high and constant welding current while using the heat generated by the electrical contact resistance between steel sheets to melt a thin sheet and thick sheet so as to suppress expulsion under conditions where preliminary conduction secures a certain contact area between the steel sheets and contact resistance remains.

Second conduction: Conduction method making the current lower than the first conduction to suppress inside expulsion while making the nugget grow mainly in the diametrical direction.

Third conduction: Conduction method making the current higher than the second conduction and making the nugget grow not only in the diametrical direction, but also especially in the sheet thickness direction when the nugget size becomes a certain extent of size at the second conduction step.

(b) The inventors conducted numerous experiments to try to define conduction times and current values in the different conductions using the sheet thicknesses and sheet gaps of the steel sheets as parameters. As a result, they were able to define suitable conduction times and welding currents in spot welding of steel sheets.

Note that, the "conduction time" is defined by the number of cycles corresponding to the frequency of the alternating current power supply. The amount of input heat is proportional to the integral of the input current values. These depend on the frequency of the alternating current power supply. For example, if a 50 Hz alternating current power source, 1 cycle=1/50 seconds.

Preliminary Conduction $$tu \geq 2 \times Ta^2 \times Tg$$

where, Ta: average sheet thickness (mm)
(average sheet thickness Ta is defined by the value found by dividing the sum of the sheet thicknesses by 2)
Tg: maximum value of sheet gap (mm)
tu: preliminary conduction time (cycles).

The units of sheet thickness and sheet gap are mm (same below).

The current value is at the most the same as the current at the first conduction.

First Conduction $$1 \leq t1 \leq 7 \times Ta$$

where, t1: constant conduction time of first conduction (cycles)

$$I1 \leq 10\sqrt{(Ta)} + 2$$

where, I1 is current value at first conduction, units of kA.

Second Conduction $$1 \leq t2$$

where, t2: second conduction time (cycles)

$$I2 \leq 10\sqrt{(Ta)}$$

where, I2 is current value at second conduction, units of kA.

Third Conduction $$5Ta \leq t2 + t3 \leq 15Ta$$

where, t3: third conduction time (cycles)

$$10\sqrt{(Ta)} < I3$$

where, I3 is current value at third conduction, units of kA.

(c) When promoting nugget growth in the third conduction, rapid promotion of growth would be accompanied with the occurrence of expulsion. Therefore, in the third conduction as well, the inventors discovered that by setting a gradually increasing conduction pattern (for example, upslope conduction), it is possible to suppress the occurrence of expulsion while promoting the growth of the nugget.

(d) The inventors discovered that when growing the nugget, rather than by controlling just the current, it is possible to form a more suitable nugget by changing the pressing force by the electrodes along with the nugget growth.

In particular, the inventors discovered that by lowering the pressing force at the time of the third conduction, it is possible to weaken the cooling by the electrodes and promote nugget growth in the sheet thickness direction (electrode direction). However, lowering the pressing force too much leads to the occurrence of expulsion, so it is preferable to make the pressing force ½ or more of the pressing force in the first conduction or second conduction.

(e) Furthermore, the inventors discovered that if providing a cooling step (time) between the first conduction step and second conduction step and/or between the second conduction step and third conduction step, the weld zone as a whole is cooled and nugget growth can be suppressed once so as to be effective in suppression of expulsion.

The present invention was made based on the above discoveries and has as its gist the following:

(1) A spot welding method joining a plurality of superposed steel sheets, the spot welding method comprising
a preliminary conduction step of gradually applying current,
a first conduction step of running a constant current at a current value I1,
a second conduction step next running current at a current value I2, and further
a third conduction step of running current at a current value I3, wherein $$I1 > I2 \text{ and } I2 < I3,$$

where the units of I1, I2, and I3 are kA.

(2) The spot welding method according to (1) wherein a sheet thickness ratio comprised of a ratio of a total of the sheet thicknesses of the plurality of steel sheets and a sheet thickness of the steel sheet with the thinnest sheet thickness among the plurality of steel sheets is 4.5 or more.

(3) The spot welding method according to (1) or (2) wherein the plurality of steel sheets are superposed so that the steel sheet with the thinnest sheet thickness becomes the outermost side.

(4) The spot welding method according to any one of (1) to (3) wherein the preliminary conduction step makes a welding current increase by upslope conduction.

(5) The spot welding method according to any one of (1) to (3) wherein the preliminary conduction step is pulsation conduction.

(6) The spot welding method according to (4) wherein a conduction time of the upslope conduction of the preliminary conduction step is 1 to 30 cycles.

(7) The spot welding method according to (5) wherein a conduction time of the pulsation conduction of the preliminary conduction step is 1 to 10 cycles and an idling time is 1 to 5 cycles.

(8) The spot welding method according to any one of (1) to (7) wherein when designating a conduction time of the preliminary conduction step as tu, designating a conduction time of the first conduction step as t1, designating an average sheet thickness of a value found by dividing the sum of the sheet thicknesses of the steel sheets by 2 as Ta, and designating a maximum value of the sheet gap comprised of the gap between steel sheets as Tg, the following relationships are satisfied:

$$tu \geq 2Ta^2Tg,$$

$$1 \leq t1 \leq 7Ta, \text{ and}$$

$$I1 \leq 10\sqrt{(Ta)}+2$$

where, the units of tu and t1 are the numbers of cycles of alternating current applied and the units of Ta and Tg are mm.

(9) The spot welding method according to (8) wherein when designating a conduction time of the second conduction step as t2, the following relationships are satisfied:

$$1 \leq t2 \text{ and}$$

$$I2 \leq 10\sqrt{(Ta)}$$

where, the units of t2 are the numbers of cycles of alternating current applied.

(10) The spot welding method according to (8) or (9) wherein when designating a conduction time of the third conduction step as t3, the following relationships are satisfied:

$$5Ta \leq t2+t3 \leq 15Ta \text{ and}$$

$$10\sqrt{(Ta)} < I3$$

where, the units of t3 are the numbers of cycles of alternating current applied.

(11) The spot welding method according to any one of (1) to (10) which makes a welding current increase by upslope conduction in the third conduction step.

(12) The spot welding method according to any one of (1) to (11) which makes a pressing force by spot welding electrodes decrease in the third conduction step.

(13) The spot welding method according to (12) wherein when designating a pressing force after the decrease as P2 and designating a pressing force before the decrease as P1, $$0.5 \times P1 \leq P2 < P1.$$

(14) The spot welding method according to any one of (1) to (13) further comprising a cooling step where no welding current is run at least at one period between the first conduction step and the second conduction step and between the second conduction step and the third conduction step.

(15) The spot welding method according to (14) wherein the cooling time of the cooling step is 10 cycles or less.

Advantageous Effects of Invention

According to the present invention, the problem is to obtain a suitable welded joint in spot welding of a plurality of superposed steel sheets even when there is a gap between the steel sheets (sheet gap) and further the sheet thickness ratio (sum of sheet thicknesses of superposed steel sheets/sheet thickness of thinnest steel sheet) is large. In particular, the object is application to an automobile member. It is possible to provide spot welding able to be applied even when arranging a relatively thin steel sheet at the outermost layer (electrode-most side).

In particular, this effect is exhibited in spot welding of a plurality of steel sheets including a high strength steel sheet and further having the steel sheet with the thinnest sheet thickness arranged at the outermost side.

DESCRIPTION OF EMBODIMENTS

The spot welding method of the present invention (below, sometimes referred to as the "present invention welding method") is a spot welding method comprising clamping a set of sheets of a plurality of superposed steel sheets by a pair of spot welding electrodes (in this Description, simply referred to as "electrodes"), pressing it by the electrodes while running current, and melting and joining the contact parts of the steel sheets.

In the present invention welding method, the steel sheets applied are not particularly limited in steel type, form, mechanical properties, etc. The present invention welding method can be applied to any steel type, form, and/or mechanical properties of steel sheets so long as conduction is possible. Regarding the form of steel sheets, for example, the present invention welding method can be applied to electroplated steel sheets, hot dip coated steel sheets, and alloyed hot dip coated steel sheets.

Further, in the method of the present invention, the welding power supply is not limited to a specific power supply so long as it is a power supply enabling conduction of the steel sheets at the required number of cycles. In addition to a single-phase alternating current and three-phase rectified current, a direct current inverter can also be used as a welding power supply. When using a direct current inverter, the effect of the present invention welding method can be achieved.

Figure 1:
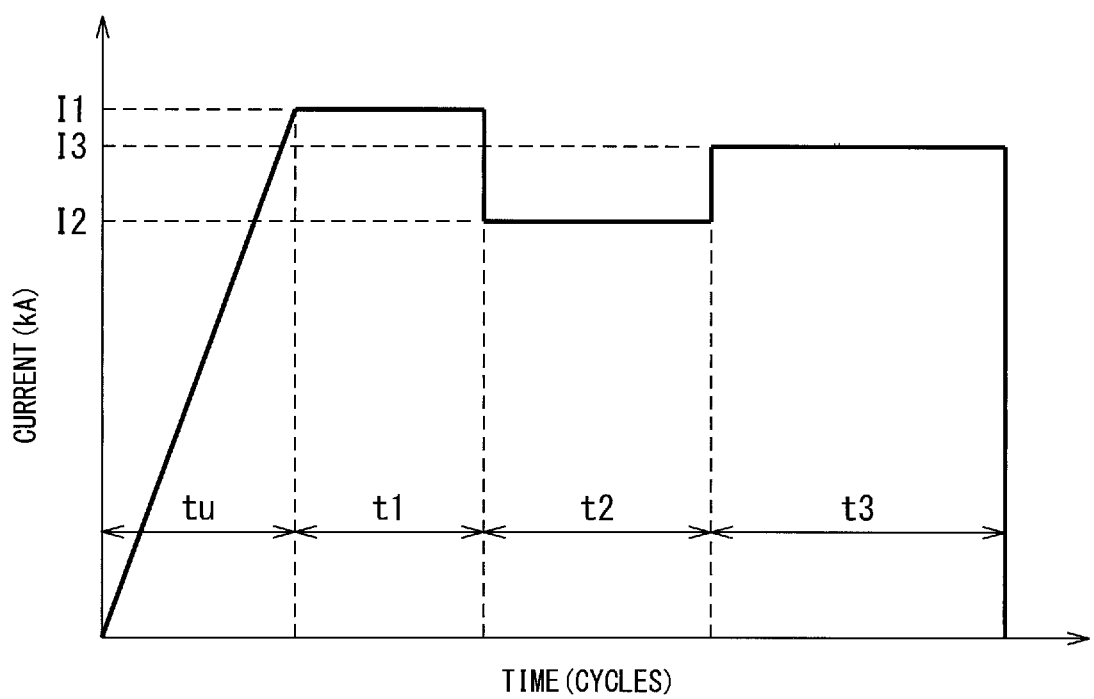
FIG. 1 is a view showing one example of the mode of conduction of the present invention.

FIG. 1 shows one example of a mode of conduction of the present invention welding method.

The spot welding method according to the present invention is comprised of a preliminary conduction step, first conduction step, second conduction step, and third conduction step. The notations used in the present invention will be explained below.

Current

The current value at the first conduction step is designated as I1, the current value at the second conduction step is designated as I2, the current value at the third conduction step is designated as I3, and the units are made kA in each case.

Conduction Time

The conduction time at the preliminary conduction step is designated as tu, the conduction time at the first conduction step is designated as t1, the conduction time at the second conduction step is designated as t2, the conduction time at the third conduction step is designated as t3, and the units are made the number of cycles in each case. Here, the "number of cycles" is the number of cycles of the alternating current power supply waveform relating to the input. The input heat amount is proportional to the integral of the input current value. This is because these are dependent on the alternating current power supply frequency. For example, if a 50 Hz alternating current power supply, 1 cycle=1/50 seconds. If the welding power supply is a direct current inverter, the number of cycles is one derived from the frequency of the alternating current power supply input to the inverter.

Sheet Thickness and Sheet Gap

The average sheet thickness of the steel sheets is designated as Ta, the maximum value of the gap between steel sheets is designated as Tg (in this Description, sometimes called the "sheet gap"), and the units are all made mm. As explained above, when superposing three or more sheets, the average sheet thickness Ta is defined by the value of the sum of the sheet thicknesses divided by 2.

The sheet gap Tg is the gap between steel sheets at the portion being spot welded. The gaps between the steel sheets at portions not being spot welded are not considered.

Sheet Thickness Ratio

The sheet thickness ratio is the ratio of the total of the sheet thicknesses of the plurality of steel sheets and the sheet thickness of the steel sheet with the thinnest sheet thickness among the plurality of steel sheets.

Sheet thickness ratio=(total of sheet thicknesses of plurality of steel sheets)/(sheet thickness of steel sheet with thinnest sheet thickness)

If a thin steel sheet is arranged at the plurality of steel sheets and a thin steel sheet is arranged in particular at the outermost side, due to the cooling effect by the electrodes, the temperature falls and the nugget becomes harder to form the closer to the electrodes. The present invention solves this problem. The effect is large if the sheet thickness ratio is 4.5 or more. In particular, the upper limit is not set, but if arranging the thinnest steel sheet at the outermost side and the sheet thickness ratio exceeds 10, the spot weldability deteriorates, so the upper limit may also be made 10.

Next, the conduction steps will be explained.

Preliminary Conduction Step

The preliminary conduction step is a step aimed at gradually enlarging the contact area between steel sheets and gradually increases the amount of the welding current applied (for example, upslope conduction). If rapidly applying current, the current concentrates at a locally contacted part. This part rapidly melts and results in expulsion, so this conduction method runs current so that the amount of current gradually increases (for example upslope conduction) to avoid local heating.

The method of making the amount of application of welding current gradually increase is the method of making the current increase in upslope conduction (FIG. 1, FIG. 4, FIG. 5, FIG. 6, and FIG. 7). Further, in this case, the current value may be increased from 0, but also may be started from a certain specific current value.

In addition, for example, pulsation conduction also can be applied. If pulsation conduction, it is possible to alternately perform conduction and cooling and adjust the conduction time and cooling time to enable adjustment of the amount of input heat.

The current I0 of the pulsation conduction is made less than the current I1 of the first conduction step and continues for the time t0. I0=(0.5 to 0.8)·I1 is preferable, but the invention is not limited to this. It is possible to set the current I0 high and make the continuation time t0 shorter or to set the current I0 low and make the continuation time t0 longer.

For example, by making the conduction time 1 to 10 cycles and the idling time 1 to 5 cycles and repeating conduction and idling, it is possible to obtain effects similar to upslope conduction. Note that, the conduction time and idling time should be suitably set considering the extent by which the required effect is exhibited.

The conduction time tu should be 1 cycle or more. If the conduction time tu is less than 1 cycle, the above effect of the upslope conduction cannot be obtained, so the time is made 1 cycle or more. Preferably, tu≥2×Ta$^2$×Tg. The inventors conducted various tests and discovered that there is a correlation between the conduction time and average sheet thickness and maximum sheet gap and thereby derived the above relationship.

First Conduction Step

The first conduction step is a step for suppressing expulsion while using the heat generated due to electrical contact resistance between steel sheets to melt together a thin sheet and thick sheet by running a high and constant current under conditions where preliminary conduction secures a certain contact area between the steel sheets and contact resistance remains. After the current reaches the current I1 due to the upslope conduction or other preliminary conduction, the current I1 is then run at the time t1. By conduction at the current I1 and time t1, the contact resistance between steel sheets is utilized to promote the generation of heat between a thin sheet and thick sheet (temperature rise) and enlarge the melted part. The current I1 is set considering the sheet thicknesses of the set of sheets covered.

The conduction time t1 is made a time of a range securing the required amount of heat generation and free from the occurrence of expulsion and should be made at least 1 cycle or more. This is because if less than 1 cycle, the input heat is insufficient and sometimes no nugget will be formed. Preferably, $1 \le t1 \le 7 \times Ta$. The inventors engaged in various tests and discovered that there is a correlation between the conduction time t1 and the average sheet thickness Ta and thereby derived the above relationship. If T1 is larger than $7 \times Ta$, sometimes expulsion occurs during the conduction time t1.

Further, the conduction current I1 is not particularly limited. However, the inventors discovered that there is a correlation between I1 and the average sheet thickness Ta. That is, I1 is preferably made $10\sqrt{(Ta)}+2$ or less. If I1 exceeds this value, the nugget rapidly grows and expulsion easily occurs. The lower limit of I1 is also not particularly limited. However, it is preferably made $10\sqrt{(Ta)}-4$ or more. If I1 is too small, growth of the nugget is not promoted and a nugget of a sufficient size cannot be obtained.

Second Conduction Step

This is a step of decreasing the welding current, suppressing the inside expulsion, and making the nugget grow mainly in the diametrical direction when a nugget is formed and grows to a certain extent at the first conduction step. Therefore, it is necessary to make I2<I1. The current I2 may be a current sufficient for promoting melting of the steel sheets, but should be set considering the sheet thicknesses of the set of sheets covered. From this viewpoint, the inventors looked for the relationship with the average sheet thickness whereupon they discovered that preferably $I2 \le 10\sqrt{(Ta)}$. The lower limit is not particularly limited so long as an extent where a nugget grows, but is preferably made $10\sqrt{(Ta)}-6$ or more.

The conduction time t2 at the second conduction step should be 1 cycle or more. This is so that a nugget is formed at the first conduction step and a certain extent of nugget size can be secured. The upper limit is also not particularly limited, but is preferably set to match the next third conduction step.

Third Conduction Step

This is a step where the current is made higher than the second conduction and the nugget is made to grow not only in the diametrical direction, but also the sheet thickness direction when the nugget size becomes a certain extent of size in the second conduction step. For this reason, in the third conduction step, a current I3 higher than the current I2 (>I2) is run during the time t3. Melting of the steel sheets is further promoted by conduction by the current I3 and time t3, that is, enlargement of the nugget (enlargement in both of lateral direction and sheet thickness direction) is promoted. Contact and melting of the steel sheets proceed until the end of the second conduction step, that is, the conduction area sufficiently increases (current density falls), so the level of current I3 where expulsion occurs rises. Therefore, I3 can be made larger than I2.

Furthermore, the inventors studied I3. That is, the current I3 should be set in the range where the nugget shape can be enlarged to the desired shape without causing expulsion. The inventors discovered that the current I3 should be set considering the average sheet thickness since there is an effect of the total sheet thickness. As a result, it was learned that preferably $I3 > 10\sqrt{(Ta)}$. The upper limit of I3 does not have to be particularly limited. It is sufficient to set it so that no expulsion occurs in spot welding.

The sum of the conduction time t2 and the conduction time t3 (t2+t3) is an important indicator in terms of the contact between the steel sheets and growth of the nugget. Usually, in spot welding two sheets, it is known that at about $10 \times Ta$ (cycles) or $10 \times Ta+2$ (cycles), the temperature rise tends to become saturated. The inventors sought the relationship between the average sheet thickness and the conduction time from this viewpoint. As a result, they discovered that it is sufficient to make the total conduction time of t2 and t3 5Ta to 15Ta. If the total conduction time of t2 and t3 is shorter than 5Ta, since the nugget does not sufficiently grow, suitable spot welding cannot be obtained. On the other hand, if the total conduction time between t2 and t3 is longer than 15Ta, the temperature distribution becomes substantially steady, the nugget size becomes saturated, and the productivity ends up falling.

On the other hand, the second conduction step may be made longer, but the speed of growth of the nugget slows by the relatively small amount of the welding current. For this reason, there is a possibility that the welding time for obtain suitable spot welding will become longer. For this reason, t3 may be made longer than t2.

Figure 6:
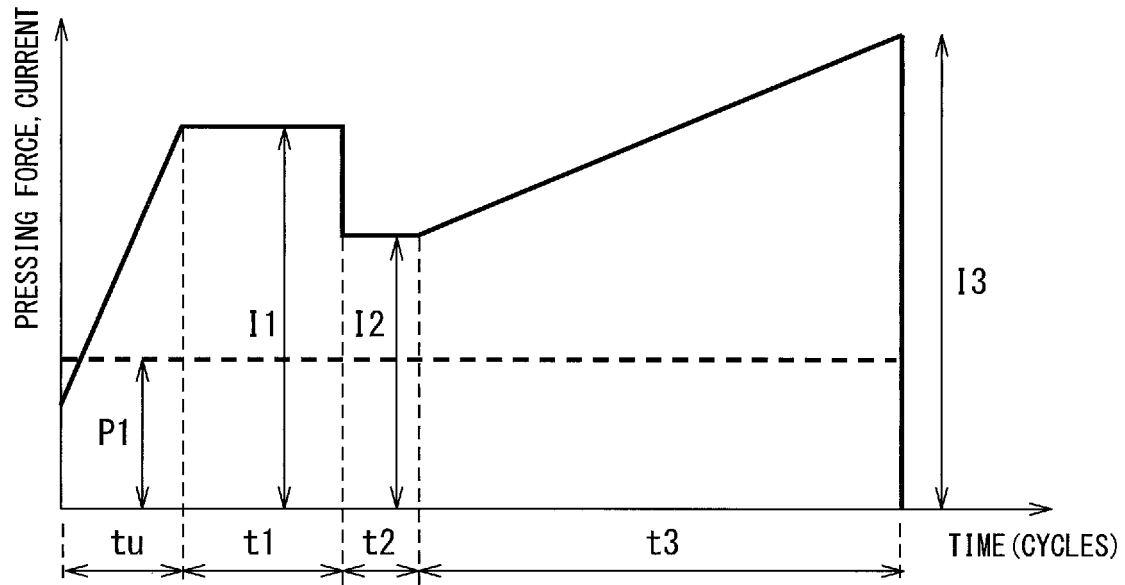
FIG. 6 is a view showing another example of the relationship between a conduction mode and pressing force of the present invention.

At the third conduction step, the object is to make the nugget grow. It is particularly important to make it grow in the sheet thickness direction. Therefore, by not rapid heating, but by making the amount of heat input gradually increase in the same way as the preliminary heating, it is possible to suppress the occurrence of expulsion. The method of gradually increasing the input heat amount is not particularly limited, but it is preferable to make the welding current increase by upslope conduction. For example, the third conduction current I3 may be made a function of the conduction time. For example, by making it a primary function of the conduction time, a monotonously increasing upslope conduction pattern is obtained (FIG. 6 and FIG. 7).

By making the third conduction step upslope conduction, it is possible to gradually grow a nugget, so this can also serve as the second conduction step. That is, in this case, it is possible to make the second conduction step a short time. For example, it is possible to make t2=1 (cycle).

Furthermore, the inventors discovered that when making the nugget grow in the sheet thickness direction, it is sufficient to reduce the cooling effect by the electrodes. That is, the electrode itself is water-cooled, so the temperature in the sheet thickness direction becomes lowest at the parts in contact with the electrode. For this reason, the nugget is difficult to grow in the sheet thickness direction.

Figure 5:
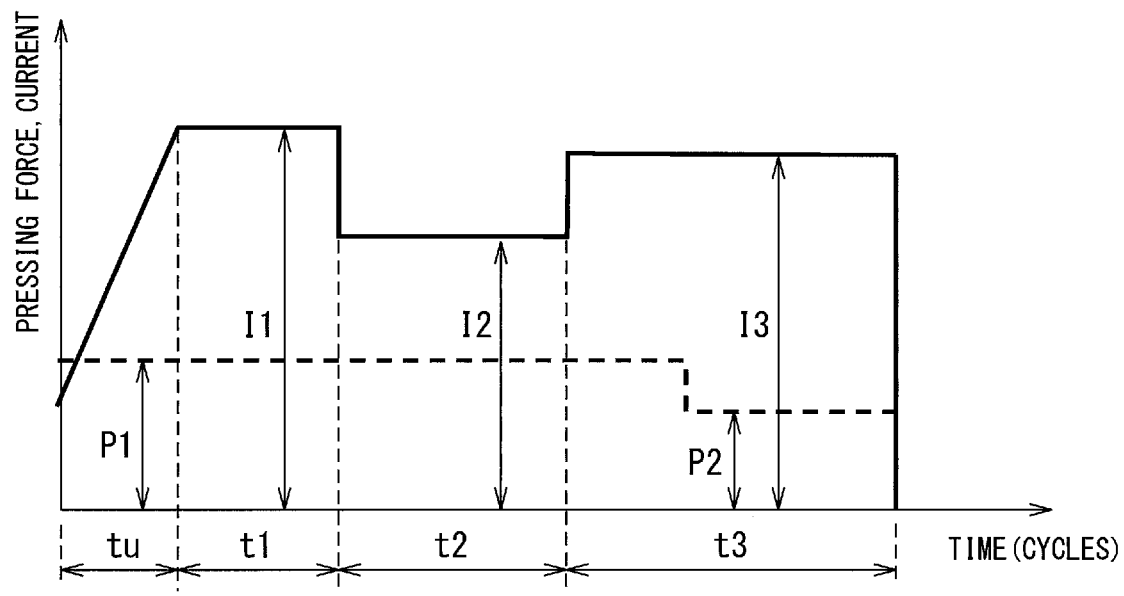
FIG. 5 is a view showing another example of the relationship between a conduction mode and pressing force of the present invention.
Figure 7:
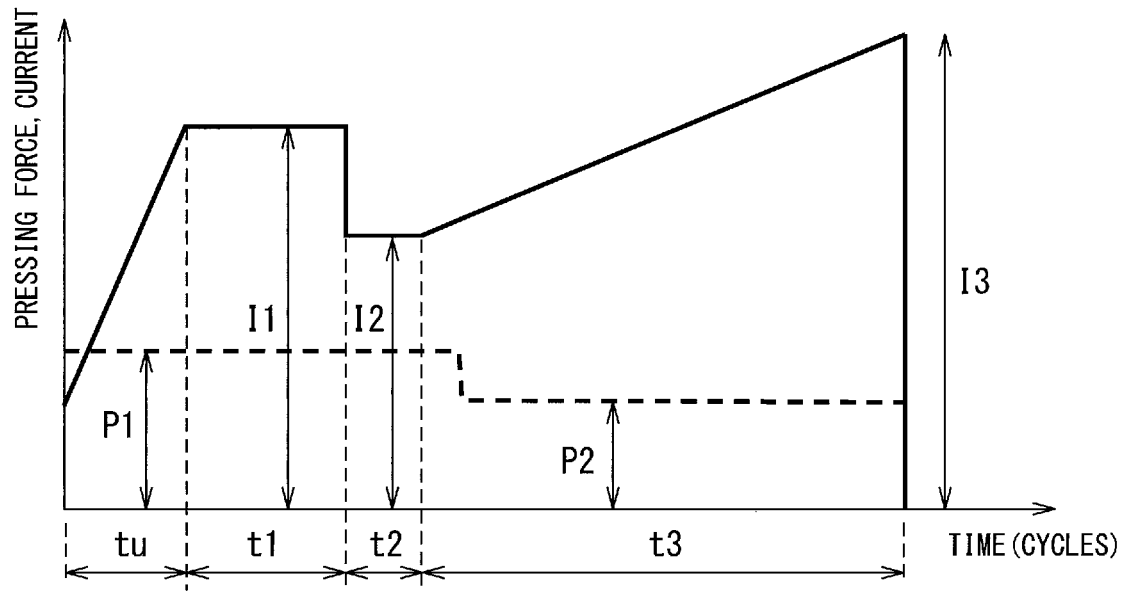
FIG. 7 is a view showing another example of the relationship between a conduction mode and pressing force of the present invention.

Therefore, the inventors discovered that when making the nugget grow in the sheet thickness direction in the third conduction step, by decreasing the pressing force by the electrodes and decreasing the contact area between the electrodes and steel sheets to raise the current density and simultaneously weaken the cooling effect by the electrodes, the nugget grows more effectively in the sheet thickness direction as well (FIG. 5 and FIG. 7). The lower limit value of the pressing force along with the decrease in the pressing force is not particularly limited. However, if making the pressing force decrease too much, expulsion occurs, so the pressing force is preferably made half (½) of before the decrease or more. That is, if designating the pressing force before decreasing the pressing force, that is, at the first conduction step and the second conduction step, as P1 and the pressing force after decreasing it P2, the pressing force should be ½P1≤P2<P1. Further, preferably ⅔P1≤P2<P1. The upper limit of the pressing force P2 after decrease should be smaller than P1, but to reliably obtain this effect, 0.9P1 should be made the upper limit.

The timing of decreasing the pressing force is not particularly limited so long as during the third conduction. However, if entering the stage of growth of the nugget in the sheet thickness direction, that is, the third conduction, it is preferable to make the pressing force decrease as fast as possible. For example, the pressing force should be made to decrease within 3 cycles after the start of the third conduction. It is more preferably performed within 1 cycle.

Figure 4:
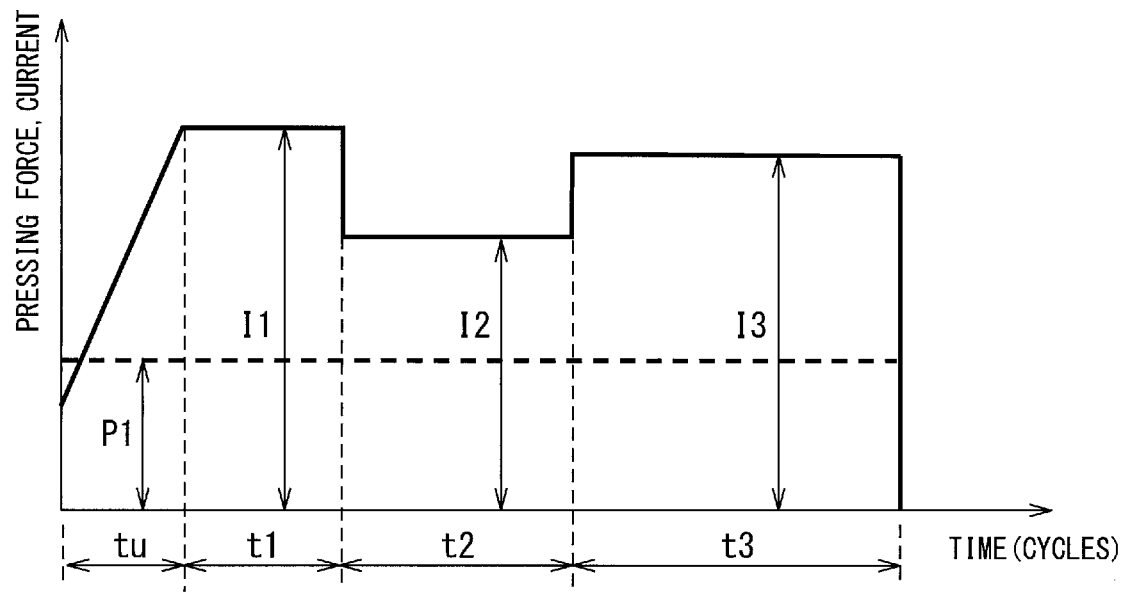
FIG. 4 is a view showing one example of the relationship between a conduction mode and pressing force of the present invention.

FIGS. 4 to 7 show the case of combination of the conduction pattern and pattern of the pressing force. FIG. 4 and FIG. 5 are cases where the third conduction step is constant current conduction, while FIG. 6 and FIG. 7 are cases where the third conduction pattern is upslope conduction. Further, FIG. 4 and FIG. 6 show the case where the pressing force is constant, while FIG. 5 and FIG. 7 are cases of reducing the pressing force in the third conduction step.

Cooling Step

Figure 8:
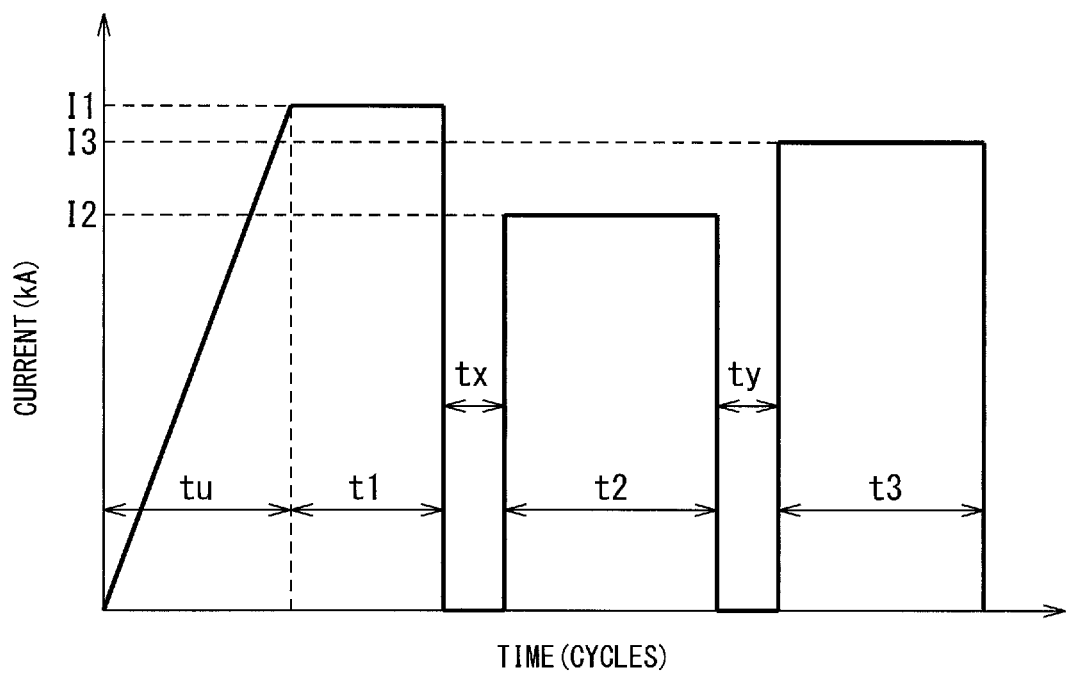
FIG. 8 is a view showing an example having a cooling step in the conduction mode of the present invention.
Figure 9:
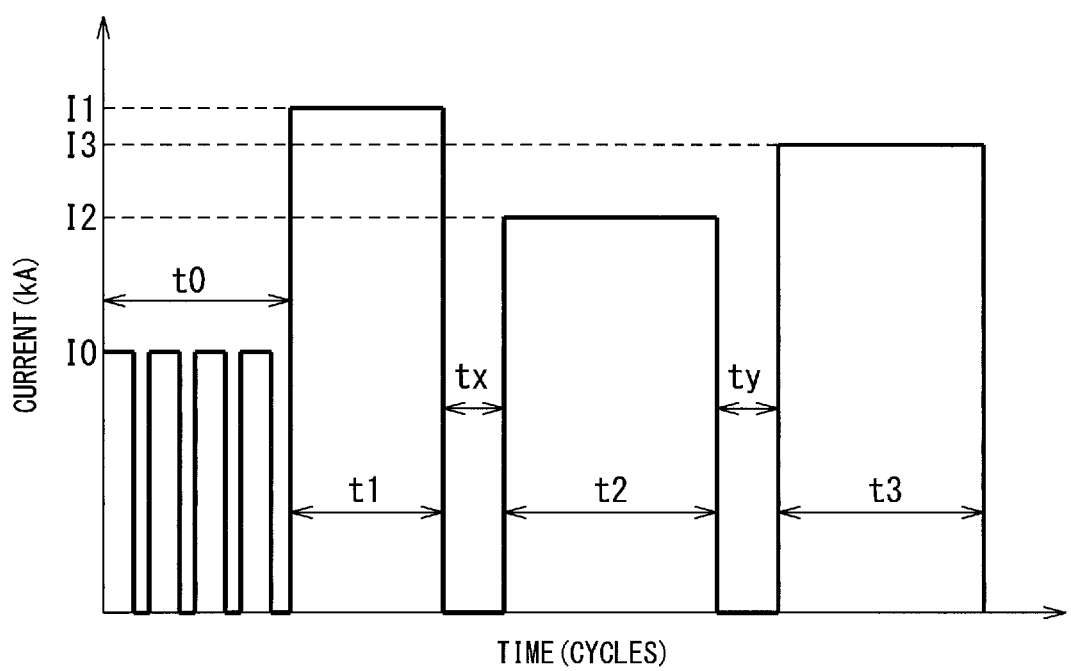
FIG. 9 is a view showing another example having a cooling step in the conduction mode of the present invention.

Between the first conduction step and second conduction step and/or between the second conduction step and third conduction step, a cooling step where no welding current is run may also be provided (FIG. 8 and FIG. 9). By providing the cooling step, the nugget growth is eased, the occurrence of expulsion is suppressed, and the nugget formation becomes stable.

If providing the cooling step, compared with spot welding performing the first conduction, second conduction, and third conduction consecutively, the welding completion time becomes longer by the amount of the cooling time and the productivity appears to fall, but by providing the cooling step, it is possible to set the current I2 and/or current I3 high and shorten the conduction time t2 and/or conduction time t3 at the second conduction step and/or third conduction step, so the productivity does not fall. FIG. 8 shows an example of adding a cooling step to the conduction pattern shown in FIG. 1. FIG. 9 shows one example of the case where the preliminary conduction step of FIG. 8 is pulsation conduction.

Figure 2:
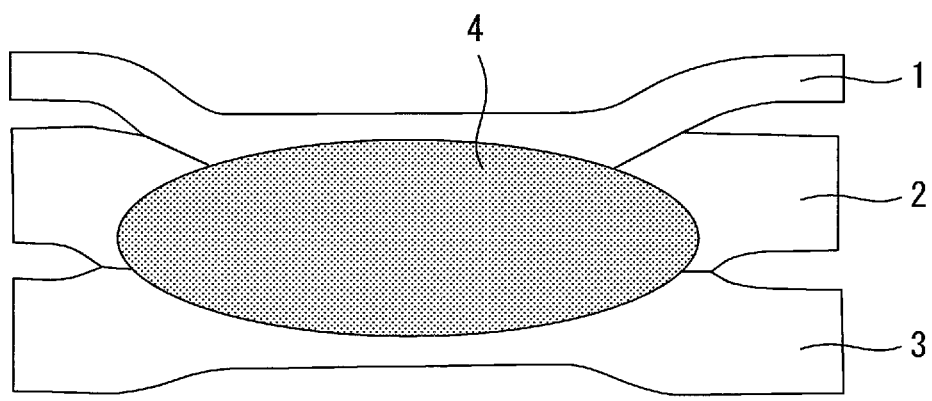
FIG. 2 is a view schematically showing one example of a spot welded joint according to the present invention.

FIG. 2 schematically shows the form of a welded joint formed by the present invention welding method from a set of sheets of three superposed steel sheets (thin steel sheet at outside).

In a set of sheets comprised of three superposed steel sheets, if an outside steel sheet is the thinnest in sheet thickness, sometimes this thin steel sheet and the adjoining steel sheet are not sufficiently joined at the contact interface, but in the present invention welding method, even if the sheet thickness of the outside steel sheet is the thinnest, the contact surfaces of the outside thin steel sheet and adjoining steel sheet can be strongly joined.

According to the present invention, even if there is a sheet gap between steel sheets, a nugget is reliably formed between a thin sheet and thick sheet. The size of the nugget can be found by cutting the set of sheets along the line passing through the center of the spot welding after the spot welding, polishing the cross-sectional surface, etching it, then observing it by an optical microscope.

Figure 3:
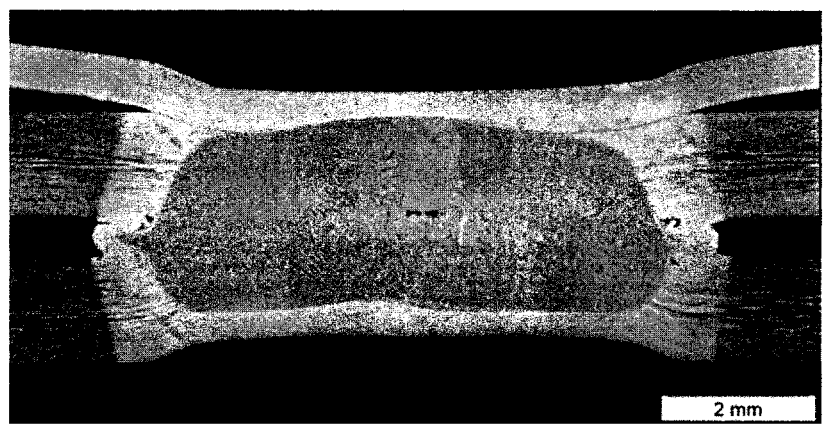
FIG. 3 is a view showing a cross-sectional structure obtained by observing one mode of a welded joint formed in the present invention by an optical microscope.

According to the present invention welding method, as shown in FIG. 2, the nugget 4 is formed across the thin steel sheet and two relatively thick steel sheets. FIG. 3 shows the cross-sectional structure of the welded joint formed by the present invention welding method observed by an optical microscope. It can be confirmed that the nugget is formed passing through the three steel sheets and the interfaces between all steel sheets are sufficiently melted. In particular, the thinnest steel sheet is at the outside, but it is understood that the nugget is also formed including this steel sheet.

EXAMPLES

Next, examples of the present invention will be explained, but the conditions in the examples are illustrations of the conditions employed for confirming the workability and effects of the present invention. The present invention is not limited to these illustrations. The present invention can utilize various conditions so long as not departing from the gist of the present invention and achieving the object of the present invention.

Example 1

Using the two types of sets of sheets shown in Table 1, spot welding was performed. The steel sheets were all galvannealed steel sheets. The amount of deposition per side was 45 g/m². The spot welding conditions are shown in Table 2. For the welding power source, a single phase alternating current was used.

For the electrodes, a Cr—Cu DR type having a nominal size of 16 mm, a tip diameter of 6 mm, and a tip R of 40 mm was used. The electrode holding time after three stages of conduction was made 5 cycles in all cases. After welding, the set of sheets was cut along a line passing through the center of the spot welding. The cut surface was polished and etched, then the size of the nugget was measured by an optical microscope. The measurement results are shown in Table 3 together with the occurrence of expulsion. A nugget of (Nugget size between Steel Sheets 1 and 2)≥4×√ (sheet thickness of Steel Sheet 1) was judged as passing.

Example 2

Under the same conditions as Example 1, spot welding was performed by the conduction pattern and pressing force pattern of FIG. 5. The spot welding conditions and results of evaluation are shown in Table 4. For the welding power source, single-phase alternating current was used.

As a result, no expulsion occurred and a good nugget was formed. Note that, a nugget of a nugget size between steel sheets of ≥4×√ (sheet thickness of Steel Sheet 1 (thinnest steel sheet)) was judged as passing. Below, the same criteria were used for judgment in Examples 3, 4, and 5 as well.

Example 3

Under the same conditions as Example 1, spot welding was performed by the conduction pattern and pressing force pattern of FIG. 6. The spot welding conditions and results of evaluation are shown in Table 5. For the welding power source, single-phase alternating current was used.

As a result, no expulsion occurred and a good nugget was formed.

Example 4

Under the same conditions as Example 1, spot welding was performed by the conduction pattern and pressing force pattern of FIG. 7. The spot welding conditions and results of evaluation are shown in Table 6. For the welding power source, single-phase alternating current was used.

As a result, no expulsion occurred and a good nugget was formed.

Example 5

Using the two types of sets of sheets shown in Table 7, under the same conditions as Example 1, spot welding was performed provided with a cooling step. The "cooling" in the table shows the cooling step. The steel sheets were all galvannealed steel sheets. The amount of deposition per side was 45 g/m$^2$.

The spot welding conditions are shown in Table 8 and the results of evaluation are shown in Table 9. For the welding power source, single-phase alternating current was used.

As a result, no expulsion occurred and a good nugget was formed.

TABLE 1

| | Steel Sheet 1 | | Steel Sheet 2 | | Steel Sheet 3 | |
|---|---|---|---|---|---|---|
| Set of sheets | Sheet thickness (mm) | Tensile strength (MPa) | Sheet thickness (mm) | Tensile strength (MPa) | Sheet thickness (mm) | Tensile strength (MPa) |
| A | 0.7 | 305 | 1.6 | 1513 | 1.6 | 1024 |
| B | 0.6 | 310 | 2.0 | 1026 | 1.6 | 610 |

TABLE 2

| Treatment no. | Set of sheets | Steel Sheet 1 thickness (mm) | Gap between steel sheets (mm) | Electrode pressing force (kgf) | Upslope conduction time tu (cycles) | Conduction time t1 (cycles) | Current I1 (kA) | Conduction time t2 (cycles) | Current I2 (kA) | Conduction time t3 (cycles) | Current I3 (kA) | Remarks |
|---|---|---|---|---|---|---|---|---|---|---|---|---|
| 1 | A | 0.7 | 1.5 | 400 | 3.0 | 4 | 10 | 10 | 8.5 | 7 | 9.5 | Inv. ex. |
| 2 | A | 0.7 | 1.5 | 400 | 3.0 | 4 | 10 | 10 | 10 | 7 | 9.5 | Comp. ex. |
| 3 | A | 0.7 | 1.5 | 400 | 3.0 | 4 | 10 | 10 | 8.5 | 7 | 8.5 | Comp. ex. |
| 4 | A | 0.7 | 1.5 | 400 | 0.0 | 4 | 10 | 10 | 8.5 | 7 | 9.5 | Comp. ex. |
| 5 | A | 0.7 | 2 | 400 | 10.0 | 4 | 10 | 10 | 8.5 | 7 | 9.5 | Inv. ex. |
| 10 | B | 0.6 | 1.5 | 450 | 5.0 | 4 | 11 | 12 | 9.0 | 8 | 10.0 | Inv. ex. |
| 11 | B | 0.6 | 1.5 | 450 | 5.0 | 4 | 11 | 12 | 11.0 | 8 | 10.0 | Comp. ex. |
| 12 | B | 0.6 | 1.5 | 450 | 5.0 | 4 | 11 | 12 | 9.0 | 8 | 9.0 | Comp. ex. |
| 13 | B | 0.6 | 1.5 | 450 | 15.0 | 4 | 11 | 12 | 9.0 | 8 | 10.0 | Inv. ex. |

TABLE 3

| Treatment no. | Set of sheets | Occurrence of expulsion | 4√ (thickness of Steel Sheet 1) (mm) | Nugget size between Steel Sheets 1 and 2 (mm) | Nugget size between Steel Sheets 2 and 3 (mm) | Remarks |
|---|---|---|---|---|---|---|
| 1 | A | No | 3.35 | 4.7 | 8.1 | Inv. ex. |
| 2 | A | Yes | 3.35 | 3.1 | 6.5 | Comp. ex. |
| 3 | A | No | 3.35 | 3.2 | 7.3 | Comp. ex. |
| 4 | A | Yes | 3.35 | 2.8 | 6.4 | Comp. ex. |
| 5 | A | No | 3.35 | 4.6 | 8.0 | Inv. ex. |
| 10 | B | No | 3.10 | 4.5 | 8.3 | Inv. ex. |
| 11 | B | Yes | 3.10 | 2.9 | 6.9 | Comp. ex. |
| 12 | B | No | 3.10 | 3.0 | 7.2 | Comp. ex. |
| 13 | B | No | 3.10 | 4.5 | 8.1 | Inv. ex. |

TABLE 4

| Treatment no. | Set of sheets | Steel Sheet 1 thickness (mm) | Gap between steel sheets (mm) | Electrode pressing force P1 (kgf) | Electrode pressing force P2 (kgf) | Upslope conduction time tu (cycles) | Conduction time t1 (cycles) | Current I1 (kA) | Conduction time t2 (cycles) |
|---|---|---|---|---|---|---|---|---|---|
| 1 | A | 0.7 | 2 | 400 | 300 | 10 | 4 | 10 | 10 |
| 13 | B | 0.6 | 1.5 | 450 | 350 | 15 | 4 | 11 | 12 |

| | | 4√ | Nugget size between | Nugget size between |

TABLE 4-continued

| Treatment no. | Current I2 (kA) | Conduction time t3 (cycles) | Current I3 (kA) | Generation of expulsion | 4√(thickness of Steel Sheet 1) (mm) | Nugget size between Steel Sheets 1 and 2 (mm) | Nugget size between Steel Sheets 2 and 3 (mm) | Remarks |
|---|---|---|---|---|---|---|---|---|
| 1 | 8.5 | 5 | 9.5 | No | 3.3 | 4.3 | 8.1 | Inv. ex. |
| 13 | 9.0 | 6 | 10.0 | No | 3.1 | 4.5 | 8.2 | Inv. ex. |

TABLE 5

| Treatment no. | Set of sheets | Steel Sheet 1 thickness (mm) | Gap between steel sheets (mm) | Electrode pressing force P1 (kgf) | Electrode pressing force P2 (kgf) | Upslope conduction time tu (cycles) | Conduction time t1 (cycles) | Current I1 (kA) | Conduction time t2 (cycles) |
|---|---|---|---|---|---|---|---|---|---|
| 1 | A | 0.7 | 2 | 400 | — (P1 constant) | 10 | 4 | 10 | 3 |
| 13 | B | 0.6 | 1.5 | 450 | — (P1 constant) | 15 | 4 | 11 | 3 |

| Treatment no. | Current I2 (kA) | Conduction time t3 (cycles) | Current I3 (kA) | Generation of expulsion | 4√(thickness of Steel Sheet 1) (mm) | Nugget size between Steel Sheets 1 and 2 (mm) | Nugget size between Steel Sheets 2 and 3 (mm) | Remarks |
|---|---|---|---|---|---|---|---|---|
| 1 | 8.5 | 12 | 12.0 | No | 3.3 | 4.2 | 8.0 | Inv. ex. |
| 13 | 9.0 | 12 | 12.0 | No | 3.1 | 4.4 | 8.1 | Inv. ex. |

TABLE 6

| Treatment no. | Set of sheets | Steel Sheet 1 thickness (mm) | Gap between steel sheets (mm) | Electrode pressing force P1 (kgf) | Electrode pressing force P2 (kgf) | Upslope conduction time tu (cycles) | Conduction time t1 (cycles) | Current I1 (kA) | Conduction time t2 (cycles) |
|---|---|---|---|---|---|---|---|---|---|
| 1 | A | 0.7 | 2 | 400 | 300 | 10 | 4 | 10 | 3 |
| 13 | B | 0.6 | 1.5 | 450 | 350 | 15 | 4 | 11 | 3 |

| Treatment no. | Current I2 (kA) | Conduction time t3 (cycles) | Current I3 (kA) | Occurrence of expulsion | 4√(thickness of Steel Sheet 1) (mm) | Nugget size between Steel Sheets 1 and 2 (mm) | Nugget size between Steel Sheets 2 and 3 (mm) | Remarks |
|---|---|---|---|---|---|---|---|---|
| 1 | 8.5 | 10 | 12.0 | No | 3.3 | 4.3 | 8.1 | Inv. ex. |
| 13 | 9.0 | 10 | 12.0 | No | 3.1 | 4.5 | 8.3 | Inv. ex. |

TABLE 7

| Set of sheets | Steel Sheet 1 | | Steel Sheet 2 | | Steel Sheet 3 | |
|---|---|---|---|---|---|---|
| | Sheet thickness (mm) | Tensile strength (MPa) | Sheet thickness (mm) | Tensile strength (MPa) | Sheet thickness (mm) | Tensile strength (MPa) |
| A | 0.7 | 317 | 1.8 | 1515 | 1.8 | 1024 |
| B | 0.6 | 313 | 2.1 | 1025 | 1.8 | 610 |

TABLE 8

| Treatment no. | Set of sheets | Steel Sheet 1 thickness (mm) | Gap between steel sheets (mm) | Electrode pressing force (kgf) | Upslope conduction time tu (cycles) | Conduction time t1 (cycles) | Current I1 (kA) |
|---|---|---|---|---|---|---|---|
| 1 | A | 0.7 | 1.5 | 450 | 5 | 3 | 10.5 |
| 2 | A | 0.7 | 1.5 | 450 | 5 | 3 | 10.5 |
| 3 | A | 0.7 | 1.5 | 450 | 5 | 3 | 10.5 |
| 4 | A | 0.7 | 1.5 | 450 | 5 | 3 | 10.5 |
| 5 | A | 0.7 | 1.5 | 450 | 5 | 3 | 10.5 |
| 6 | A | 0.7 | 1.5 | 450 | 0 | 3 | 10.5 |
| 7 | A | 0.7 | 2 | 450 | 10 | 3 | 10.5 |
| 10 | B | 0.6 | 1.5 | 500 | 5 | 4 | 11.5 |
| 11 | B | 0.6 | 1.5 | 500 | 5 | 4 | 11.5 |
| 12 | B | 0.6 | 1.5 | 500 | 5 | 4 | 11.5 |
| 13 | B | 0.6 | 1.5 | 500 | 15 | 4 | 11.5 |
| 20 | A | 0.7 | 1.5 | 450 | (7 kA×3 cycles + no conduction 2 cycles) × 3 | 4 | 10.5 |
| 21 | A | 0.7 | 1.5 | 450 | (8 kA×2 cycles + no conduction 1 cycle) × 3 | 4 | 10.5 |

| Treatment no. | Cooling time t2 (cycles) | Conduction time t2 (cycles) | Current I2 (kA) | Cooling (cycles) | Conduction time t3 (cycles) | Current I3 (kA) | Remarks |
|---|---|---|---|---|---|---|---|
| 1 | 2 | 9 | 9.0 | 0 | 7 | 9.5 | Inv. ex. |
| 2 | 0 | 10 | 8.5 | 2 | 6 | 10.5 | Inv. ex. |
| 3 | 2 | 9 | 9.0 | 2 | 6 | 10.5 | Inv. ex. |
| 4 | 2 | 9 | 10.5 | 2 | 6 | 10.5 | Comp. ex. |
| 5 | 2 | 9 | 8.5 | 2 | 6 | 8.5 | Comp. ex. |
| 6 | 2 | 9 | 8.5 | 2 | 6 | 10.5 | Comp. ex. |
| 7 | 2 | 9 | 8.5 | 2 | 6 | 10.5 | Inv. ex. |
| 10 | 2 | 11 | 9.5 | 2 | 7 | 11.0 | Inv. ex. |
| 11 | 2 | 11 | 11.5 | 2 | 7 | 11.0 | Comp. ex. |
| 12 | 2 | 11 | 9.5 | 2 | 7 | 9.5 | Comp. ex. |
| 13 | 2 | 11 | 9.5 | 2 | 7 | 10.0 | Inv. ex. |
| 20 | 2 | 9 | 8.5 | 2 | 6 | 10.5 | Inv. ex. |
| 21 | 2 | 9 | 8.5 | 2 | 6 | 10.5 | Inv. ex. |

TABLE 9

| Treatment no. | Set of sheets | Occurrence of expulsion | 4√ (thickness of Steel Sheet 1) (mm) | Nugget size between Steel Sheets 1 and 2 (mm) | Nugget size between Steel Sheets 2 and 3 (mm) | Remarks |
|---|---|---|---|---|---|---|
| 1 | A | No | 3.35 | 4.8 | 8 | Inv. ex. |
| 2 | A | No | 3.35 | 5.0 | 8.1 | Inv. ex. |
| 3 | A | No | 3.35 | 4.7 | 8 | Inv. ex. |
| 4 | A | Yes | 3.35 | 3.3 | 6.4 | Comp. ex. |
| 5 | A | No | 3.35 | 3.2 | 7.3 | Comp. ex. |
| 6 | A | Yes | 3.35 | 3.0 | 6.3 | Comp. ex. |
| 7 | A | No | 3.35 | 4.8 | 8.1 | Inv. ex. |
| 10 | B | No | 3.10 | 4.7 | 8.2 | Inv. ex. |
| 11 | B | Yes | 3.10 | 2.9 | 6.4 | Comp. ex. |
| 12 | B | No | 3.10 | 2.7 | 7.1 | Comp. ex. |
| 13 | B | No | 3.10 | 4.7 | 7.8 | Inv. ex. |
| 20 | A | No | 3.35 | 5.0 | 8 | Inv. ex. |
| 21 | A | No | 3.35 | 4.9 | 7.9 | Inv. ex. |

INDUSTRIAL APPLICABILITY

As explained above, according to the present invention, in a set of three sheets with a high sheet thickness ratio including a high strength thick steel sheet, even if there is gap in the set of sheets, it is possible to suppress the occurrence of expulsion, secure the required nugget size to stably form a required shape of nugget, and secure the desired joint strength. Accordingly, the present invention has high applicability in welded structure manufacturing industries.

REFERENCE SIGNS LIST 1. thin steel sheet
2, 3. steel sheet
4. nugget

The invention claimed is:

1. A resistance spot welding method joining a plurality of superposed steel sheets, the spot welding method comprising:
   providing a plurality of superimposed steel sheets, with at least one steel sheet being thinner than the other steel sheets,
   providing welding electrodes pressing the plurality of the steel sheets between the electrodes, and
   comprising, in sequence, a preliminary conduction step of gradually increasing current,
   a first conduction step of running a constant current at a current value I1,
   a second conduction step of next running current at a current value I2, and then
   a third conduction step of running current at a current I3, wherein $I1 > I2$ and $I2 < I3$, where the units of I1, I2, and I3 are kA, and wherein a conduction time of the preliminary conduction step as tu, a conduction time of said first conduction step as t1, an average sheet thickness of a value found by dividing the sum of the sheet thicknesses of the steel sheets by 2 as Ta, and a maximum value of the sheet gap comprised of the gap between steel sheets as Tg, are satisfying following relationships:

$tu \geq 2Ta^2Tg,$ $1 \leq t1 \leq 7Ta,$ and $I1 \leq 10\sqrt{(Ta)}+2$ where, the units of tu and t1 are the numbers of cycles of alternating current applied and the units of Ta and Tg are mm.

2. The spot welding method according to claim 1 wherein a sheet thickness ratio comprised of a ratio of a total of the sheet thicknesses of said plurality of steel sheets and a sheet thickness of the steel sheet with the thinnest sheet thickness among said plurality of steel sheets is 4.5 or more.

3. The spot welding method according to claim 1 wherein said plurality of steel sheets are superposed so that the steel sheet with the thinnest sheet thickness becomes the outermost side.

4. The spot welding method according to claim 1 wherein said preliminary conduction step is a welding current increase by upslope conduction.

5. The spot welding method according to claim 1 wherein said preliminary conduction step is pulsation conduction.

6. The spot welding method according to claim 4 wherein a conduction time of the upslope conduction of said preliminary conduction step is 1 to 30 cycles.

7. The spot welding method according to claim 5 wherein a conduction time of the pulsation conduction of said preliminary conduction step is 1 to 10 cycles and an idling time is 1 to 5 cycles.

8. The spot welding method according to claim 1 wherein a conduction time of said second conduction step as t2 is satisfying the following relationships:

$1 \leq t2$ and $I2 \leq 10\sqrt{(Ta)}$ where, the units of t2 are the numbers of cycles of alternating current applied.

9. The spot welding method according to claim 8 wherein a conduction time of said third conduction step as t3 is satisfying the following relationships:

$5Ta \leq t2+t3 \leq 15Ta$ and $10\sqrt{(Ta)} < I3$ where, the units of t3 are the numbers of cycles of alternating current applied.

10. The spot welding method according to claim 1 wherein said third conduction step includes increasing a weld current by upslope conduction.

11. The spot welding method according to claim 1 which makes a pressing force by spot welding electrodes decrease in said third conduction step.

12. The spot welding method according to claim 11 wherein when designating a pressing force after said decrease as P2 and designating a pressing force before said decrease as P1, $0.5 \times P1 \leq P2 < P1.$ 13. The spot welding method according to claim 1 further comprising a cooling step where no welding current is run at least at one period between said first conduction step and said second conduction step and between said second conduction step and said third conduction step.

14. The spot welding method according to claim 13 wherein the cooling time of said cooling step is 10 cycles or less.

15. The spot welding method according to claim 2 wherein said plurality of steel sheets are superposed so that the steel sheet with the thinnest sheet thickness becomes the outermost side.

16. The spot welding method according to claim 2 wherein said preliminary conduction step is a welding current increase by upslope conduction.

17. The spot welding method according to claim 3 wherein said preliminary conduction step is a welding current increase by upslope conduction.

18. The spot welding method according to claim 2 wherein said preliminary conduction step is pulsation conduction.

19. The spot welding method according to claim 3 wherein said preliminary conduction step is pulsation conduction.

* * * * *